April 19, 1955    C. W. SHOWALTER    2,706,655
PACKING FOR RODS OR SHAFTS
Filed Oct. 27, 1950

INVENTOR.
Clayton W. Showalter
BY
Otto A. Earl
Attorney.

United States Patent Office 2,706,655
Patented Apr. 19, 1955

2,706,655

PACKING FOR RODS OR SHAFTS

Clayton W. Showalter, Goshen, Ind.

Application October 27, 1950, Serial No. 192,534

3 Claims. (Cl. 288—19)

This invention relates to improvements in packing for rods or shafts.

The main objects of this invention are:

First, to provide a packing for rods or shafts, the elements of which may be formed of rubber or other deformable resilient material and readily installed in a packing box and adjusted to secure the desired sealing or packing effect.

Second, to provide a packing for rods or shafts which is highly efficient and the use of which results in a uniform sealing coaction both with the stuffing box and the shaft or rod.

Third, to provide a packing made up of a plurality of packing elements which are disposed in end to end relation and which are radially expanded by endwise pressure.

Fourth, to provide a packing element for use as stated which may be very economically produced.

Objects relating to details and economies of the invention will appear from the description to follow. The invention is pointed out in the claims.

A preferred embodiment of the invention is illustrated in the accompanying drawings, in which.

Figure 1:
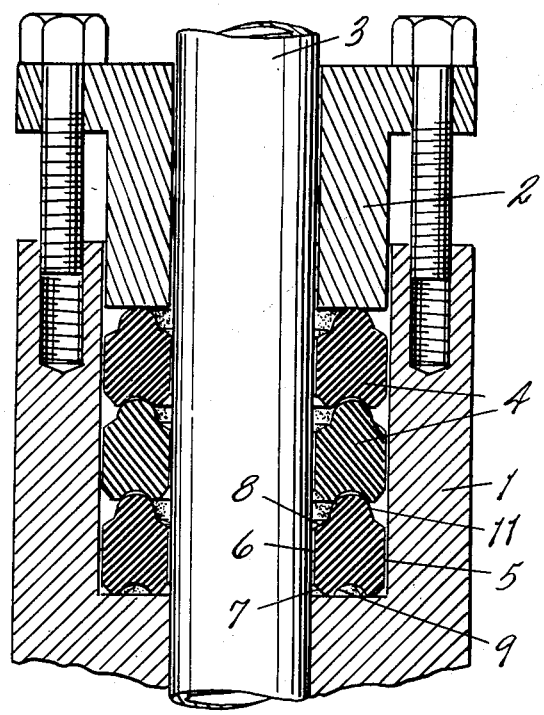
Fig. 1 is a fragmentary view partially in longitudinal section of a packing box and gland, and rod or shaft assembly with a plurality of the packing members or elements of my invention arranged in the packing box prior to the gland being adjusted to radially expand the packing elements into packing sealing engagement with the wall of the packing box and the shaft.
Figure 3:
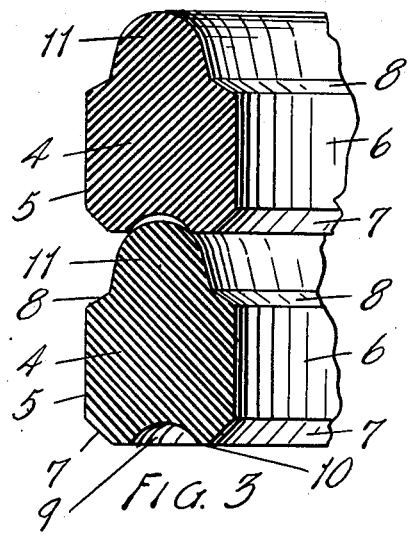
Fig. 3 is a fragmentary perspective view in section of a pair of the packing elements in noncompressed assembled relation.
Figure 2:
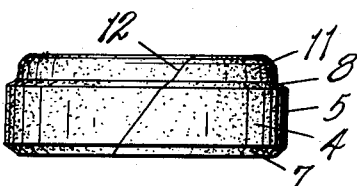
Fig. 2 is a side view of one of the packing elements.

In the accompanying drawing 1 represents a packing box and 2 a packing gland associated therewith. A rod or shaft is represented by 3. The packing elements 4 of the embodiment of my invention illustrated in Figs. 1 to 4, inclusive, are desirably formed of rubber, either natural or synthetic, and are quite solid although resilient and capable of being deformed. The elements 4 are annular and are provided with cylindrical outer peripheries or sides 5 and cylindrical inner peripheries or sides 6 which are parallel to the outer peripheries 5.

In this embodiment of Figs. 1 to 4 the ends of the members or elements 4 are beveled at 7 and 8. At one end the elements or members 4 are provided with annular grooves 9 of curved section, the edges of the grooves being spaced from the bevels 7 providing annular lands 10 at each side of the grooves. At their other ends the members 4 are provided with annular ribs 11 of an axial depth and curvature substantially greater than that of the grooves 9 as is clearly shown in Figs. 1 and 3. The ribs 11 of the embodiment of Figs. 1 to 4 merge into the bevels 8. The packing members are split or have a diagonal slit at 12 to facilitate their being arranged on a shaft or rod.

In use a plurality of the packing members or elements 4 are arranged around the shaft or rod to be packed within a stuffing box as is shown in Fig. 1. The gland 2 is then adjusted to apply endwise pressure to the packing elements and this results in the radial expansion of the packing members both inwardly and outwardly, bringing their inner sides into sealing relation to the shaft and their outer sides into sealing relation to the stuffing box. The shape of the grooves and ribs when end pressure is applied results in the effective radial expansion of the elements and the expansion is substantially uniform from end to end of the inner and outer cylindrical sides of the elements.

Figure 5:
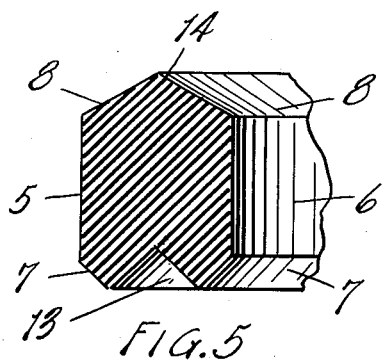
Fig. 5 is a fragmentary perspective view of a modified form or packing element of my invention.
Figure 4:
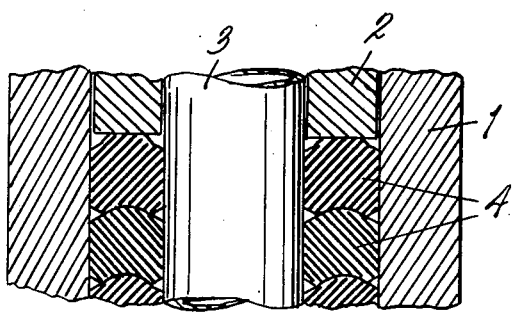
Fig. 4 is a fragmentary view illustrating a packing box assembly with the packing elements under pressure and in sealing relation to the shaft or rod and the stuffing box.
Figure 6:
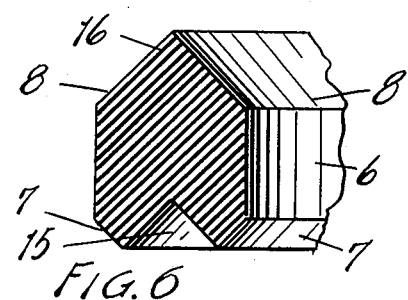
Fig. 6 is a fragmentary perspective view of another modification or embodiment of my invention.

In the modification shown in Fig. 5 the groove 13 is of V section while the rib 14 and the rib 14 are of V section. The angle formed by the side of the rib is more obtuse than that formed by the sides of the groove so that there is an effective wedging expanding action when the grooves and ribs are pressed together. In the embodiment shown in Fig. 6 the sides of the groove 15 are at a somewhat different angle than that shown in Fig. 5 and the same is true of the sides of the rib 16. The angles formed by the sides of the grooves and rib more nearly correspond with the result that the radial expansion is somewhat less for the same amount of endwise pressure as compared to the members shown in the other figures.

I have illustrated and described my packing in highly practical commercial embodiments. I have not illustrated other embodiments or adaptations which I contemplate as it is believed that this disclosure will enable those skilled in the art to embody and adapt my invention as may be desired.

Having thus described my invention, what I claim as new and desire to secure by Letters Patent is:

1. A packing for rods, shafts and the like to be disposed in a stuffing box and in surrounding relation to the rod or shaft and to receive the compressive stress of a packing gland, said packing comprising a plurality of resilient annular split elements disposed in end to end relation and having inner and outer cylindrical sides, the inner sides being parallel to the outer sides and each side being beveled at each end, corresponding ends of the elements having annular grooves of curved section, the edges of the grooves being spaced from the inner edge of the bevels providing relatively narrow annular lands at the sides of the grooves, said packing elements having annular ribs on their other ends, the rib of one element being seated in the groove of the adjacent element, said ribs being of curved section merging into the bevels, the curvature and axial depth of the ribs being substantially greater than that of the grooves whereby the packing elements are radially expanded within the stuffing box when subjected to endwise compression as by means of a packing gland associated with the stuffing box and whereby the pressure against the stuffing box and the rod or shaft therein due to such radial expansion of the elements is substantially uniform from end to end of the flat parallel portions of the inner and outer sides of the elements.

2. A packing for rods, shafts and the like to be disposed in a stuffing box and in surrounding relation to the shaft or rod and to receive the compressive stress of a packing gland, said packing comprising a plurality of resilient annular spit elements disposed in end to end relation and having inner and outer cylindrical sides, the inner sides being parallel to the outer sides, corresponding ends of the elements having annular grooves, the inner and outer edges of said grooves being substantially spaced from said inner and outer sides of the elements, said elements being beveled at the grooved ends, the bevels intersecting said inner and outer sides and forming obtuse angles therewith, said elements having annular ribs on their other ends, the axial dimension of the groove of each element being relatively small as compared that of said inner and outer sides of the element, the portion of each element between said inner and outer sides of the element being disposed in its substantial entirety between the base of its rib and the axially innermost portion of its groove, the rib of each element in its substantial entirety projecting axially outwardly beyond said inner and outer sides of the element, the ribs of the elements being seated in the grooves of adjacent elements, the axial dimension of the ribs being substantially greater than that of the grooves.

3. A packing for rods, shafts and the like to be disposed in a stuffing box and in surrounding relation to the rod or shaft and to receive the compressive stress of a packing gland, said packing comprising a plurality of resilient annular elements disposed in end to end relation, each element having a cylindrical inner side and a cylindrical outer side, the inner side being parallel to the outer side, corresponding ends of the elements having annular grooves, the other ends of the elements having annular ribs, the axial dimension of the groove of each element being relatively small as compared to that of said inner and outer sides of the element, the portion of each element between the said inner and outer sides of the element being disposed in its substantial entirety between the base of its rib and the axially innermost portion of its groove, the rib of each element in its substantial entirety projecting axially outwardly beyond said inner and outer sides of the element, the axial dimension of the ribs being substantially greater than the axial depth of the grooves, said elements when under compressive stress within a stuffing box being disposed with the axially outer most portion of a rib in seating engagement with the axially innermost portion of a groove and disposed with said inner and outer sides of one element axially spaced a substantial distance from said inner and outer sides of an adjacent element.

References Cited in the file of this patent

UNITED STATES PATENTS

| | | |
|---|---|---|
| 1,035,279 | Walker | Aug. 13, 1912 |
| 1,246,089 | Greenoe | Nov. 13, 1917 |
| 1,968,650 | Mastin | July 31, 1934 |
| 2,067,499 | Millmine | Jan. 12, 1937 |
| 2,264,147 | Dunlevy | Nov. 25, 1941 |
| 2,420,929 | Buffington | May 20, 1947 |
| 2,443,332 | Summers | June 15, 1948 |
| 2,445,410 | Smith | July 20, 1948 |
| 2,548,412 | Walker | Apr. 10, 1951 |